United States Patent
Adkins et al.

(10) Patent No.: US 9,876,794 B2
(45) Date of Patent: Jan. 23, 2018

(54) SYSTEMS AND METHODS FOR AUTHENTICATION OF PRINTER SUPPLY ITEMS

(71) Applicant: Lexmark International, Inc., Lexington, KY (US)

(72) Inventors: Christopher Alan Adkins, Lexington, KY (US); James Ronald Booth, Nicholasville, KY (US); Matthew David Clarke, Lexington, KY (US); Graydon Randall Dodson, Lexington, KY (US); Ellis Matthew King, Lexington, KY (US); Adam Jude Ahne, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 220 days.

(21) Appl. No.: 14/961,416

(22) Filed: Dec. 7, 2015

(65) Prior Publication Data

US 2017/0163640 A1   Jun. 8, 2017

(51) Int. Cl.
*H04L 29/06*   (2006.01)
(52) U.S. Cl.
CPC .................. *H04L 63/0876* (2013.01)
(58) Field of Classification Search
CPC .................................... H04L 63/0876
USPC ................................................... 726/7
See application file for complete search history.

(56) References Cited

U.S. PATENT DOCUMENTS

2012/0187185 A1*   7/2012   Sayan ................ G06Q 30/0601
235/375

OTHER PUBLICATIONS

Mockapetris, "Domain Names—Concepts and Facilities", RFC1034, 1987, Internet Society (ISOC).
Mockapetris, "Domain Names—Implementation and Specification", RFC1035, 1987, Internet Society (ISOC).
Arends, "DNS Security Introduction and Requirements", RFC4033, 2005, Internet Society (ISOC).
Krawczyk, "HMAC: Keyed-Hashing for Message Authentication", RFC2104,1997, Internet Society (ISOC).
Levine, "DNS Blacklists and Whitelists", RFC5782, 2010, Internet Society (ISOC).
Gieben, "Chain of Trust", master thesis, 2001, Stichting NLnet Labs.
Author Unknown, "The Internet of things runs on .CA", Internet blog, 2015, .CA Labs, Canada.

* cited by examiner

*Primary Examiner* — Longbit Chai

(57) ABSTRACT

Systems and methods for authenticating printer supply items using revocation lists are disclosed. Revocation lists are updated using DNSSEC to communicate between a printer and a DNS name server. A domain name is created containing a printer supply item serial number, a message digest, and a message authentication code. The domain name is sent to the DNS name server, and the returned IP address is used to update a revocation list. Other systems and methods are disclosed.

16 Claims, 8 Drawing Sheets

SYSTEMS AND METHODS FOR AUTHENTICATION OF PRINTER SUPPLY ITEMS

CROSS REFERENCES TO RELATED APPLICATIONS

None.

BACKGROUND

1. Field of the Disclosure

The present disclosure relates generally to authentication of printer supply items and more particularly to updating a revocation list using an Internet name server.

2. Description of the Related Art

Printers use consumables such as toner cartridges, fusers, etc. These consumables are often counterfeited and sold to unsuspecting consumers. Counterfeit supplies do not conform to the printer manufacturer's requirements and may damage the customer's printers. To deter counterfeiters, printer manufacturers incorporate authentication modules into the consumables. Printers verify the authenticity of consumables by communicating with the authentication modules. Thus, to counterfeit a consumable a counterfeiter must also counterfeit the associated authentication module. Authentication modules contain, for example, authentication ASICs that are difficult to counterfeit.

However, a determined counterfeiter may duplicate authentication ASICs. The duplicates are identical and thus have the same internal serial number. Printers may be fooled by the duplicated authentication ASICs enabling counterfeiters to sell counterfeit printer supply items. Eventually, the printer manufacturer discovers the counterfeit printer supply items, analyzes the duplicated authentication ASICs, and adds the duplicated serial number to a revocation list of revoked serial numbers. This revocation list is used by printers to detect duplicated authentication ASICs and to alert users that their printer supply item is a counterfeit. Of course, the counterfeiters are free to duplicate another authentication ASIC which will work in the printers until the new serial number is also added to the revocation list. Thus, it is crucial to quickly update the printer's revocation list as new duplicated authentication ASIC serial numbers are discovered to minimize the number of counterfeit consumables.

The revocation list may be updated by updating the printer firmware. This is difficult to do in the field because firmware files are large and sending firmware updates places a burden on customer networks. Also, many customers have network firewalls that prevent a printer from connecting to an update server located outside the firewall using network file transfer protocols such as FTP. Thus, once a printer is installed it may never receive updated firmware. An updated revocation list may be written to a printer supply item's authentication module during manufacturing and the updated revocation list may be transferred to a printer when the printer supply item is installed into the printer. In this way, the printer's revocation list may be updated while the printer is in the field. However, it may take many months for an updated revocation list to be seen by all printers in the field since existing inventory of older consumables must be used up before the newer consumables make it to the printers. During that delay, many counterfeit consumables may reach the market. Also, if a printer is only given counterfeit supplies it will never receive an updated revocation list. What is needed is a method to more quickly update revocation lists of printers in the field that works through firewalls.

SUMMARY

The invention, in one form thereof, is directed to a method of operating an authentication module for a printer supply item to manage a revocation list. The authentication module includes a non-volatile memory. The method includes retrieving a first serial number from the non-volatile memory; transmitting a domain name from the authentication module to a printer, the domain name includes the first serial number; receiving a first Internet Protocol address (first IP address); determining whether the first IP address matches a predetermined target IP address and if the determination is affirmative then adding the first serial number to a first revocation list in the non-volatile memory; and transmitting the first revocation list from the authentication module to the printer.

The invention, in another form thereof, is directed to a method of operating an authentication module for a printer supply item. The authentication module includes a non-volatile memory. The method includes retrieving a first serial number from the non-volatile memory, receiving a message digest from a printer, retrieving an encryption code from the non-volatile memory; generating a message authentication code from the message digest using the encryption code; and transmitting a domain name from the authentication module to the printer, the domain name includes the first serial number, the message digest, and the message authentication code.

The invention, in yet another form thereof, is directed to a method of authenticating a printer supply item (PSI) via an Internet connection including establishing a chain of trust from an Internet root name server to a rights management name server (RM name server) using Domain Name System Security Extensions (DNSSEC) including receiving a first public key from the RM name server, retrieving a PSI serial number from the PSI; transmitting a domain name to the RM name server, the domain name includes the PSI serial number; receiving a first IP address from the RM name server cryptographically signed with a first signature; determining whether the first signature is valid using the first public key and if the determination is affirmative then determining whether the first IP address matches a predetermined target IP address and if the determination is affirmative then adding the PSI serial number to a revocation list; and determine whether the PSI serial number is on the revocation list and if the determination is affirmative then displaying an alert on a display.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
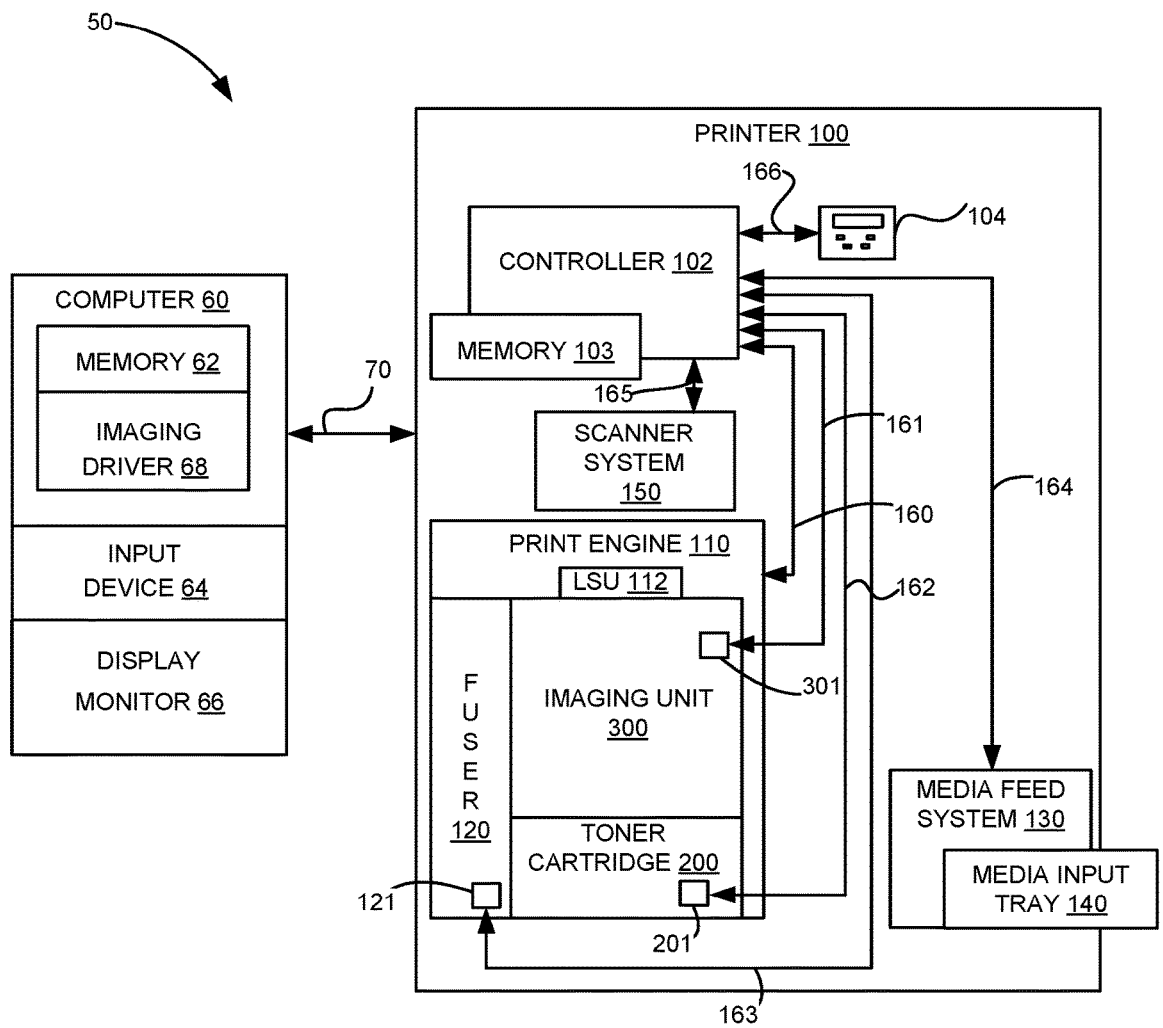
FIG. 1 is a block diagram of an imaging system including a printer according to one example embodiment.

Referring to the drawings and particularly to FIG. 1, there is shown a block diagram depiction of an imaging system 50 according to one example embodiment. Imaging system 50 includes a printer 100 and a computer 60. Printer 100 communicates with computer 60 via a communications link 70. As used herein, the term "communications link" generally refers to any structure that facilitates electronic communication between multiple components and may operate using wired or wireless technology e.g. I2C, USB, Ethernet, Wi-Fi, 4G, etc.

In the example embodiment shown in FIG. 1, printer 100 is a multifunction device (sometimes referred to as an all-in-one (AIO) device) that includes a controller 102, a user interface 104, a print engine 110, a laser scan unit (LSU) 112, one or more toner bottles or cartridges 200, one or more imaging units 300, a fuser 120, a media feed system 130 and media input tray 140, and a scanner system 150. Printer 100 may communicate with computer 60 via a standard communication protocol, such as, for example, universal serial bus (USB), Ethernet or IEEE 802.xx. Printer 100 may be, for example, an electrophotographic printer/copier including an integrated scanner system 150 or a standalone electrophotographic printer.

Controller 102 includes a processor unit and associated memory 103 and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile memory (NVRAM). Alternatively, memory 103 may be in the form of a separate electronic memory (e.g., RAM, ROM, and/or NVRAM), a hard drive, a CD or DVD drive, or any memory device convenient for use with controller 102. Controller 102 may be, for example, a combined printer and scanner controller.

In the example embodiment illustrated, controller 102 communicates with print engine 110 via a communications link 160. Controller 102 communicates with imaging unit(s) 300 and processing circuitry 301 on each imaging unit 300 via communications link(s) 161. Controller 102 communicates with toner cartridge(s) 200 and processing circuitry 201 on each toner cartridge 200 via communications link(s) 162. Controller 102 communicates with fuser 120 and processing circuitry 121 thereon via a communications link 163. Controller 102 communicates with media feed system 130 via a communications link 164. Controller 102 communicates with scanner system 150 via a communications link 165. User interface 104 is communicatively coupled to controller 102 via a communications link 166. Processing circuitry 121, 201, 301 may include a processor and associated memory such as RAM, ROM, and/or NVRAM and may provide authentication functions, safety and operational interlocks, operating parameters and usage information related to fuser 120, toner cartridge(s) 200 and imaging unit(s) 300, respectively. Controller 102 processes print and scan data and operates print engine 110 during printing and scanner system 150 during scanning.

Computer 60, which is optional, may be, for example, a personal computer, including memory 62, such as RAM, ROM, and/or NVRAM, an input device 64, such as a keyboard and/or a mouse, and a display monitor 66. Computer 60 also includes a processor, input/output (I/O) interfaces, and may include at least one mass data storage device, such as a hard drive, a CD-ROM and/or a DVD unit (not shown). Computer 60 may also be a device capable of communicating with printer 100 other than a personal computer such as, for example, a tablet computer, a smartphone, or other electronic device.

In the example embodiment illustrated, computer 60 includes in its memory a software program including program instructions that function as an imaging driver 68, e.g., printer/scanner driver software, for printer 100. Imaging driver 68 is in communication with controller 102 of printer 100 via communications link 70. Imaging driver 68 facilitates communication between printer 100 and computer 60. One aspect of imaging driver 68 may be, for example, to provide formatted print data to printer 100, and more particularly to print engine 110, to print an image. Another aspect of imaging driver 68 may be, for example, to facilitate the collection of scanned data from scanner system 150.

In some circumstances, it may be desirable to operate printer 100 in a standalone mode. In the standalone mode, printer 100 is capable of functioning without computer 60. Accordingly, all or a portion of imaging driver 68, or a similar driver, may be located in controller 102 of printer 100 so as to accommodate printing and/or scanning functionality when operating in the standalone mode.

Figure 2:
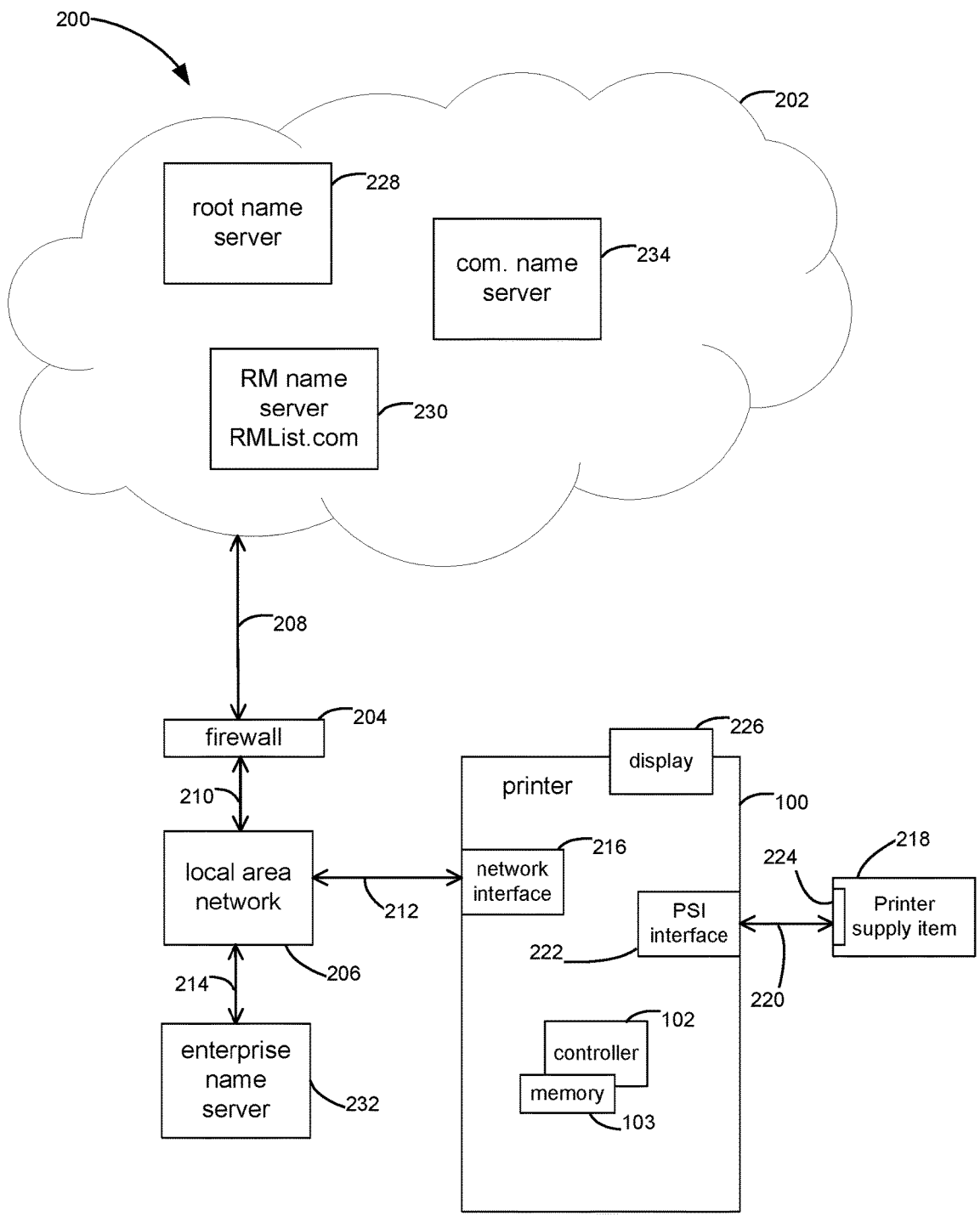
FIG. 2 is a block diagram of a communication system according to one example embodiment.

FIG. 2 shows a communication system 200. The printer 100 is connected to the Internet 202 through a firewall 204 using a local area network (LAN) 206. Alternate embodiments may omit the firewall 204, or have a trusted external name server outside the firewall. Communications links 208, 210, 212, 214 connect components of the communication system 200. The printer 100 has a network interface 216 that connects the printer 100 to the LAN 206 via communications link 212. The printer 100 is connected to a printer supply item (PSI) 218 through a communications link 220 through a PSI interface 222. In this example, the PSI 218 is a toner bottle containing an authentication module 224, the PSI interface 222 is an I2C interface, and the communications link 220 contains an I2C clock wire and an I2C data wire.

When the controller 102 detects a new PSI 218 the controller 102 reads a PSI serial number from the authentication module 224 and checks for it on a revocation list located in the controller's memory 103. The revocation list may be located in non-volatile memory. If the PSI serial number is on the revocation list the printer displays an alert on a display 226. Display 226 may be part of user interface 104. The alert may contain text alerting a user that the PSI 218 is counterfeit if, for example, the display 226 is capable of displaying text e.g. if the display is a graphic display. The alert may include lighting one or more LEDs if the display 226 lacks the capacity to display text. The printer may enter an error state and prohibit printing until the counterfeit PSI 218 is replaced with a genuine PSI. In this way, a customer is saved from the risk of damage due to the counterfeit PSI.

If the PSI serial number is not on the revocation list, the controller 102 updates the revocation list and then checks for the PSI serial number on the updated revocation list. To update the revocation list, the controller 102 first establishes a chain of trust from an Internet root name server 228 to a rights management name server (RM name server) 230 using Domain Name System Security Extensions (DNSSEC). DNSSEC is described in Network Working Group RFC4033 (March 2005). To establish the chain of trust, the controller 102 asks an enterprise name server 232 for the root name server 228 DNS keys and for the root name server's secure delegation to com. name server 234. The enterprise name server 232 may need to communicate to other name servers if the answer is not cached. Those name servers may be outside the firewall 204. Root's keys and delegation data are returned, and the controller 102 verifies the delegation data using root's keys. Next, the controller 102 asks the enterprise name server 232 for com. name server 234 DNS keys and secure delegation to RM name server 230 for RMList.com. Com.'s keys and delegation data are returned and verified by the controller 102. Next, the controller 102 asks the enterprise name server 232 for RMList.com's DNS keys. A public key is returned from the RM name server 230. The controller 102 verifies the public key. If all answers cryptographically verify, the controller 102 now has a trusted public key for RMList.com.

Now that the chain of trust has been established, the controller 102 asks enterprise name server 232 for the IP address of a domain name containing the PSI serial number, as described below with reference to FIG. 4, cryptographically signed with a signature. The requested information is unlikely to be cached by the enterprise name server 232 so the request is eventually passed to RM name server 230. RM name server 230 parses the domain name and extracts the PSI serial number. If the PSI serial number is on a revocation list located on the RM name server 230 the returned IP address is, for example, 1.1.1.1. Note that the returned IP address does not correspond to an actual website for the domain name and instead is a token that represents that the PSI serial number is on the revocation list. If the PSI serial number is not on the revocation list the returned IP address is, for example, 0.0.0.0. In this way, the returned IP address signifies whether or not the PSI serial number is on the revocation list. The controller 102 determines if the signature is valid using the public key for RMList.com. If it is valid, the controller 102 determines if the returned IP address matches a predetermined target e.g. 1.1.1.1. If so, the controller 102 adds the PSI serial number to its revocation list forming an updated revocation list. If the PSI serial number is on the updated revocation list the printer displays an alert on the display 226. The IP address may be, for example, a 32-bit number e.g. IPv4. Alternatively, the IP address may be, for example, a 128-bit number e.g. IPv6.

If the DNS query for the DNSSEC records fails, or if the address query fails, it is preferable for the controller 102 to treat the PSI as genuine. Thus, if there is a problem with a network connection the printer will still operate. The controller 102 may periodically retry the failed query until it is successful. Each retry may occur after a random delay to make it more difficult for a counterfeiter to disrupt the query.

This process for managing the printer's revocation list has many advantages. It uses the DNSSEC protocol which is not blocked by most firewalls. Thus, it may work in installations that block FTP or HTTPS. The process is very fast and may take as little as one second to complete. This is important since it is preferable to alert the user that the PSI is counterfeit while the user is still standing at the printer so they know to replace the PSI with a genuine PSI. The process is secure since it relies on the DNSSEC chain of trust and thus is resistant to a man-in-the-middle attack. Only small data packets are sent which will not burden a customer's network. The data packets are simple and easy for a customer to understand which makes the process transparent.

Figure 4:
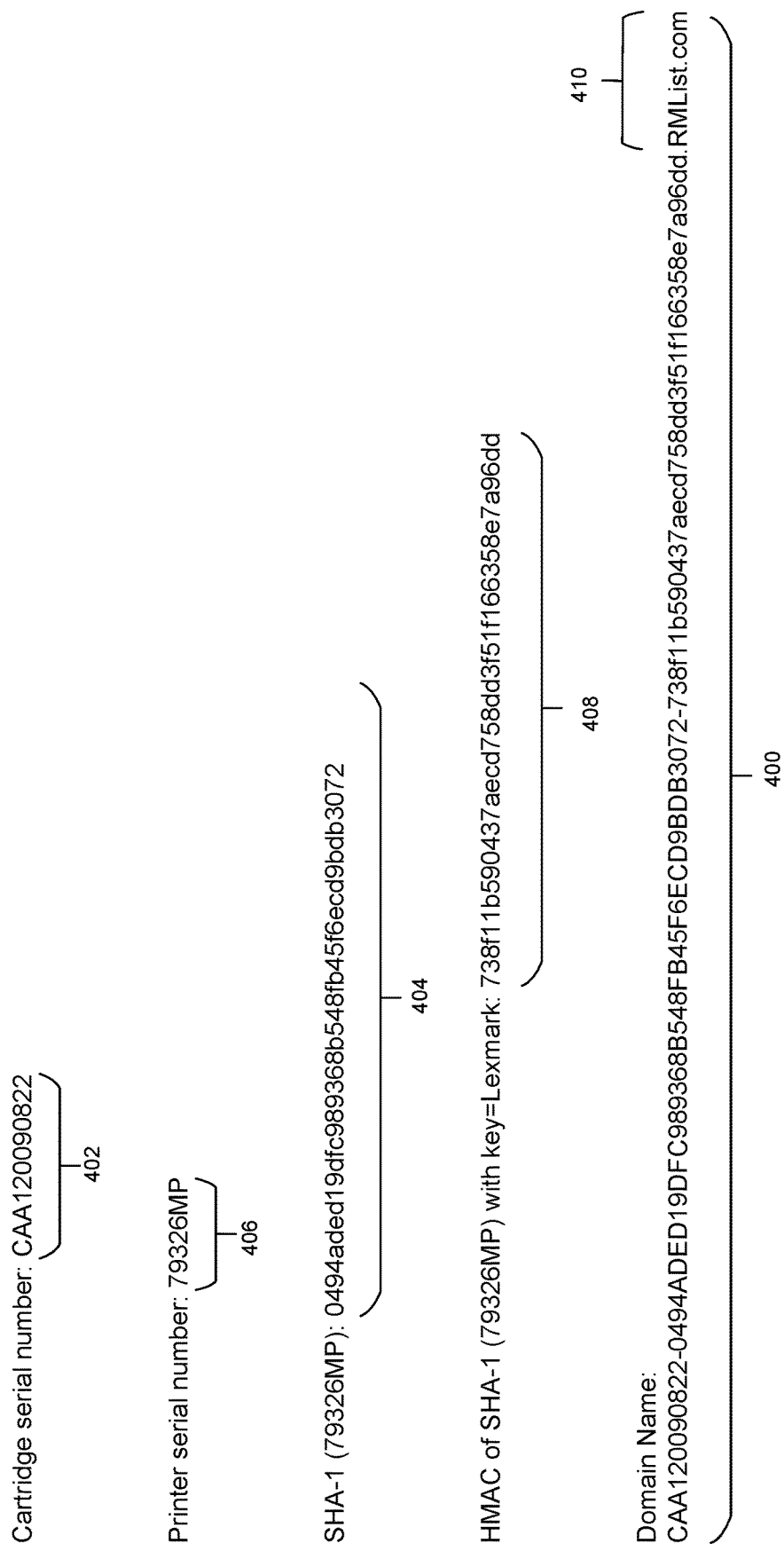
FIG. 4 shows an example domain name according to one example embodiment.

FIG. 4 shows an example domain name 400 that contains a PSI serial number that is a cartridge serial number 402, a message digest 404 created from a printer serial number 406 using a SHA-1 cryptographic hash function, and a message authentication code 408 generated from the message digest 404 using the encryption code "Lexmark" according to the process described in RFC2104 (February 1997). As used herein, the term "domain name" refers to a Domain Name System (DNS) domain name as defined in Network Working Group RFC1034 (November 1987) and RFC1035 (November 1987). In this example, the serial number of the printer reporting the cartridge serial number is hashed to anonymously identify the printer 100 to the RM name server 230. This is to protect the privacy of the owner of the printer 100. The message authentication code 408 uses an encryption code that is not known to counterfeiters to prevent a counterfeiter from flooding the RM name server 230 with bogus requests which may cause the RM name server 230 to add valid PSI serial numbers to the revocation list. If the message authentication code 408 is invalid, the RM name server 230 may ignore the request. The RM name server could supply a challenge value to which a specific response is expected, and if this expected response is not included in the domain name the RM name server may ignore the request.

Figure 3:
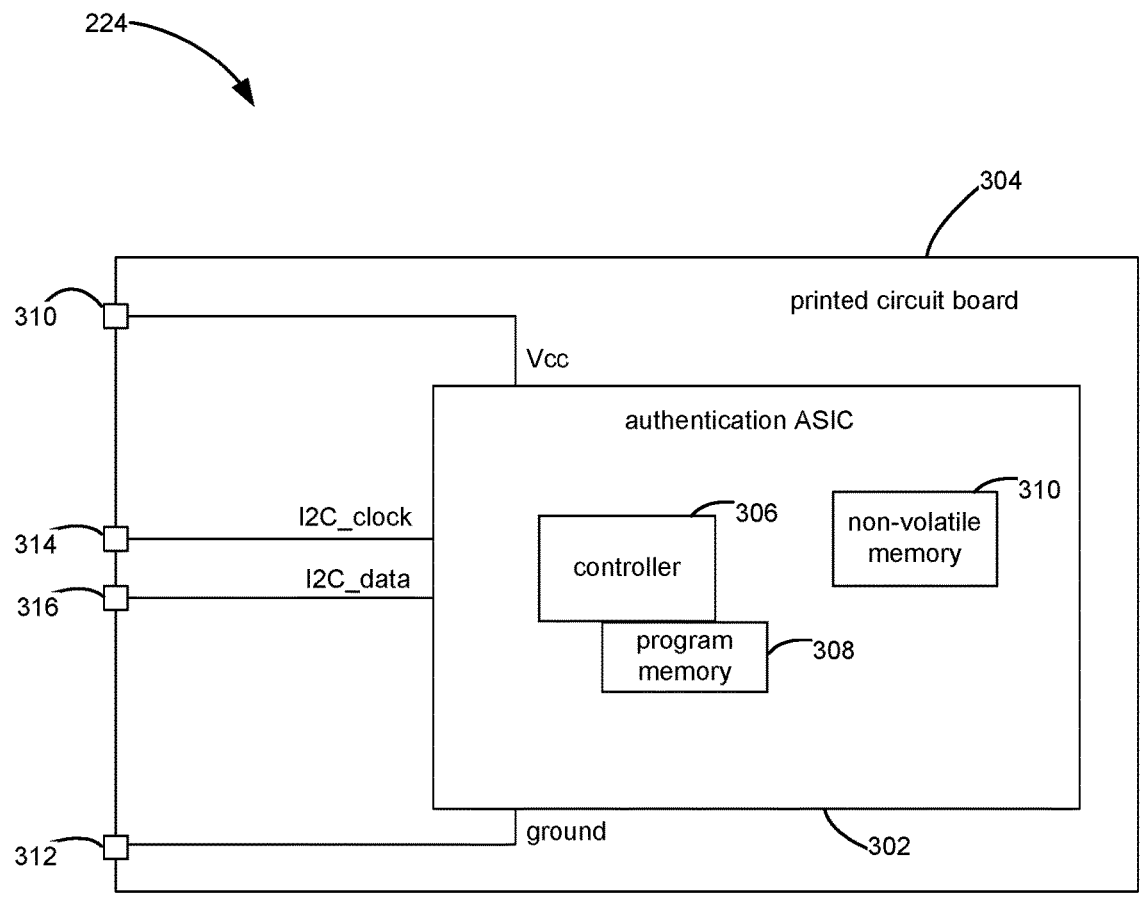
FIG. 3 is a schematic diagram of an authentication module according to one example embodiment.

FIG. 3 shows the authentication module 224 having an authentication ASIC 302 mounted to a printed circuit board (PCB) 304. The authentication module 224 is configured to facilitate authentication of a PSI. For example, the authentication ASIC 302 may perform cryptographic functions in response to requests by the printer 100 using cryptographic keys located in the authentication ASIC 302. The authentication ASIC 302 has a controller 306 configured to execute program instructions located in program memory 308. The program memory 308 is part of the controller 306 and may contain volatile memory, non-volatile memory, or a combination of volatile memory and non-volatile memory. The controller 306 may contain a central processing unit (CPU) for executing program instructions. Alternatively, the controller 306 may contain application specific circuits that do not execute program instructions. These application specific circuits may be in, for example, a field programmable gate array (FPGA). The authentication ASIC 302 also has non-volatile memory 310 that contains one or more non-volatile storage technologies e.g. EEPROM, ROM, FLASH, etc. Non-volatile memory 310 may be located contiguously within the authentication ASIC 302. Alternatively, non-volatile memory 310 may be segmented into discrete segments. Non-volatile memory 310 may be located in a separate IC package mounted to the printed circuit board 304. The PCB 304 has a power connection 310, a ground connection 312, an I2C clock connection 314, and an I2C data connection 316 for interfacing to the printer 100.

The authentication ASIC 302 may manage a revocation list located in the non-volatile memory 310. For example, the controller 306 may retrieve a PSI serial number from the non-volatile memory 310 and use it to generate a domain name 400 as shown in FIG. 4. The controller 306 may also receive a printer serial number 406 from the printer 100 over the communication link 220, generate a message digest 404 from the printer serial number 406 using a cryptographic hash function, and add the message digest 404 to the domain name 400. The controller 306 may retrieve an encryption code from the non-volatile memory 310, generate a message authentication code 408 from the message digest using a cryptographic hash function with the encryption code, and add the message authentication code to the domain name 400. It is preferable to generate the message authentication code 408 within the authentication module 224 to avoid transmitting the encryption code over the communication link 220 to protect the encryption code from discovery by counterfeiters. The controller 306 in the authentication ASIC 302 may be more resistant to reverse engineering than the controller 102 in the printer 100 because the authentication ASIC 302 has a narrower function and may be optimized to resist reverse engineering. For example, the gates of the authentication ASIC 302 may be hidden under a top-layer metal shield, internal buses may be encrypted, etc.

The controller 306 may retrieve a domain suffix 410 from the non-volatile memory 310 to use as the suffix of the domain name 400. It is preferable to locate the domain suffix 410 in the authentication module 224 so the manufacturer may change the domain suffix from time to time to, for example, reroute requests to a different name server should an earlier name server become compromised. Also, changing the domain suffix makes it more difficult to block network traffic to specific domain names to disrupt the updating of revocation lists. To prevent counterfeit PSIs from changing the domain suffix to a false one, the domain suffix name in the PSI should be cryptographically signed during manufacturing.

The controller 306 transmits the domain name 400 to the printer 100 for the printer 100 to send to the RM name server 230. The printer 100 receives an IP address from the RM name server 230 and transmits it to the authentication module 224. The controller 306 determines whether the IP address matches a predetermined target IP address such as, for example, 1.1.1.1. If they match, the controller 306 adds the PSI serial number to a revocation list located in the non-volatile memory 310. The controller 306 transmits the revocation list and the PSI serial number to the printer 100. The printer 100 checks if the PSI serial number is on the revocation list and if so the printer 100 alerts a user.

Figure 5:
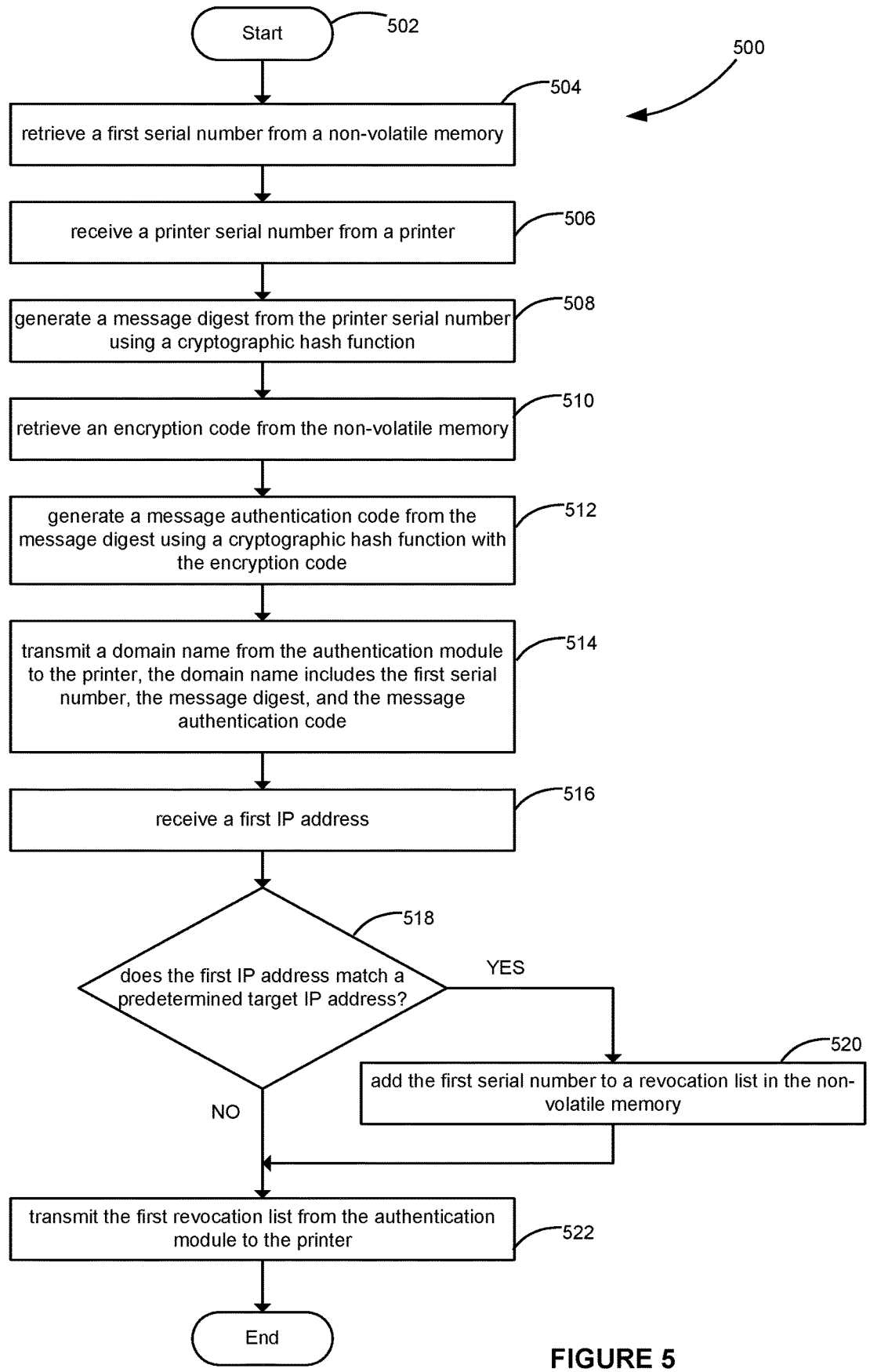
FIG. 5 is a flowchart of a method of operating an authentication module according to one example embodiment.

FIG. 5 shows an example embodiment of a method of operating an authentication module for a printer supply item to manage a revocation list according to one embodiment. Method 500 deters counterfeiters from manufacturing counterfeit printer supply items by making it more difficult to counterfeit authentication modules.

At block 502, the method starts. At block 504, the authentication module (AM) retrieves a first serial number from a non-volatile memory. At block 506, the AM receives a printer serial number from a printer. At block 508, the AM generates a message digest from the printer serial number using a cryptographic hash function e.g. MD5, SHA-1, etc. At block 510, the AM retrieves an encryption code from the non-volatile memory. At block 512, the AM generates a message authentication code from the message digest using a cryptographic hash function with the encryption code. At block 514, the AM transmits a domain name from the authentication module to the printer, the domain name includes the first serial number, the message digest, and the message authentication code. At block 516, the AM receives an IP address from the printer. At block 518, the AM determines whether the IP address matches a predetermined target IP address. If yes, at block 520 the AM adds the first serial number to a revocation list in the non-volatile memory. At block 522, the AM transmits the revocation list to the printer.

Figure 6A:
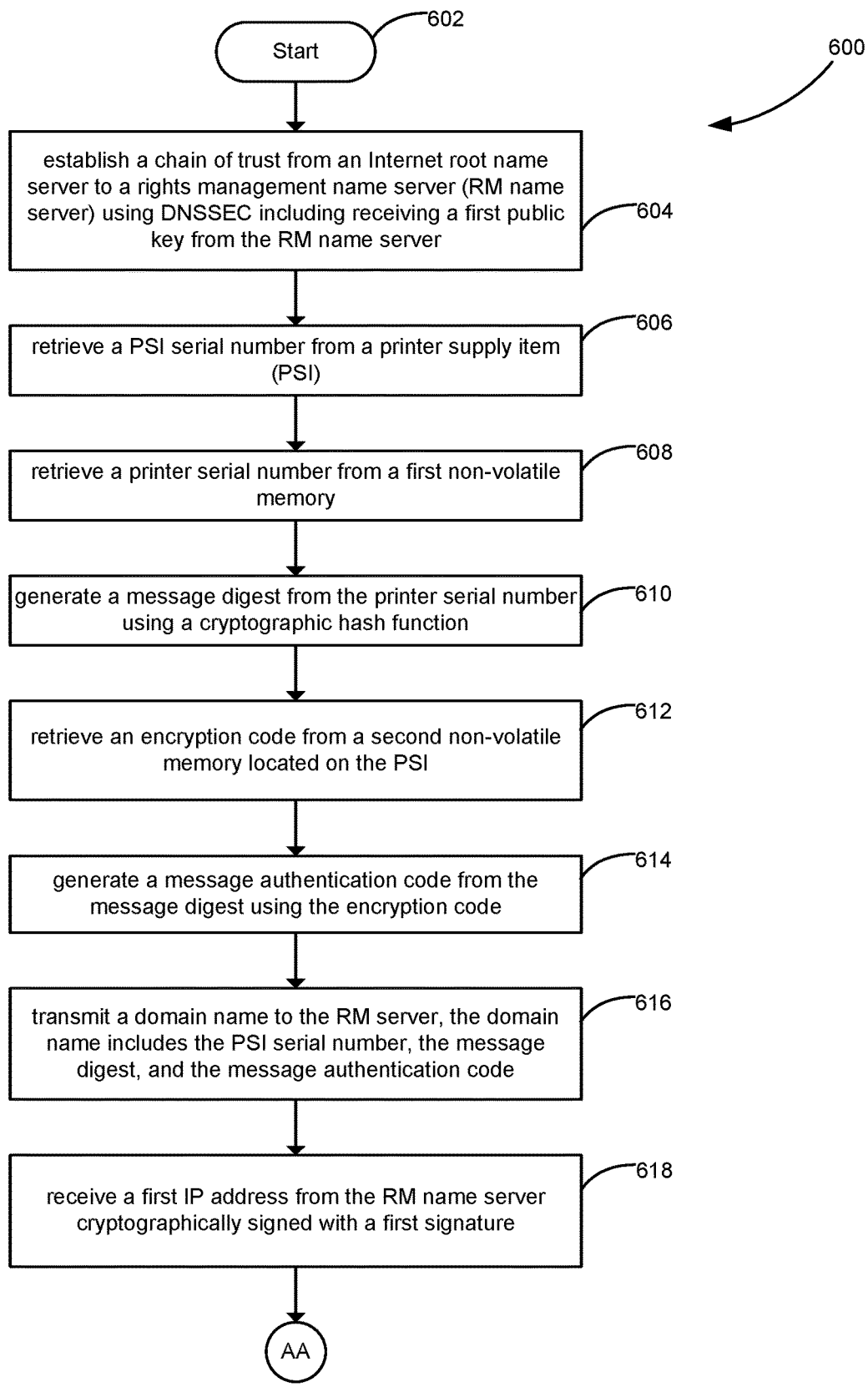
FIGS. 6A and 6B are a flowchart of a method of authenticating a printer supply item according to one example embodiment.
Figure 6B:
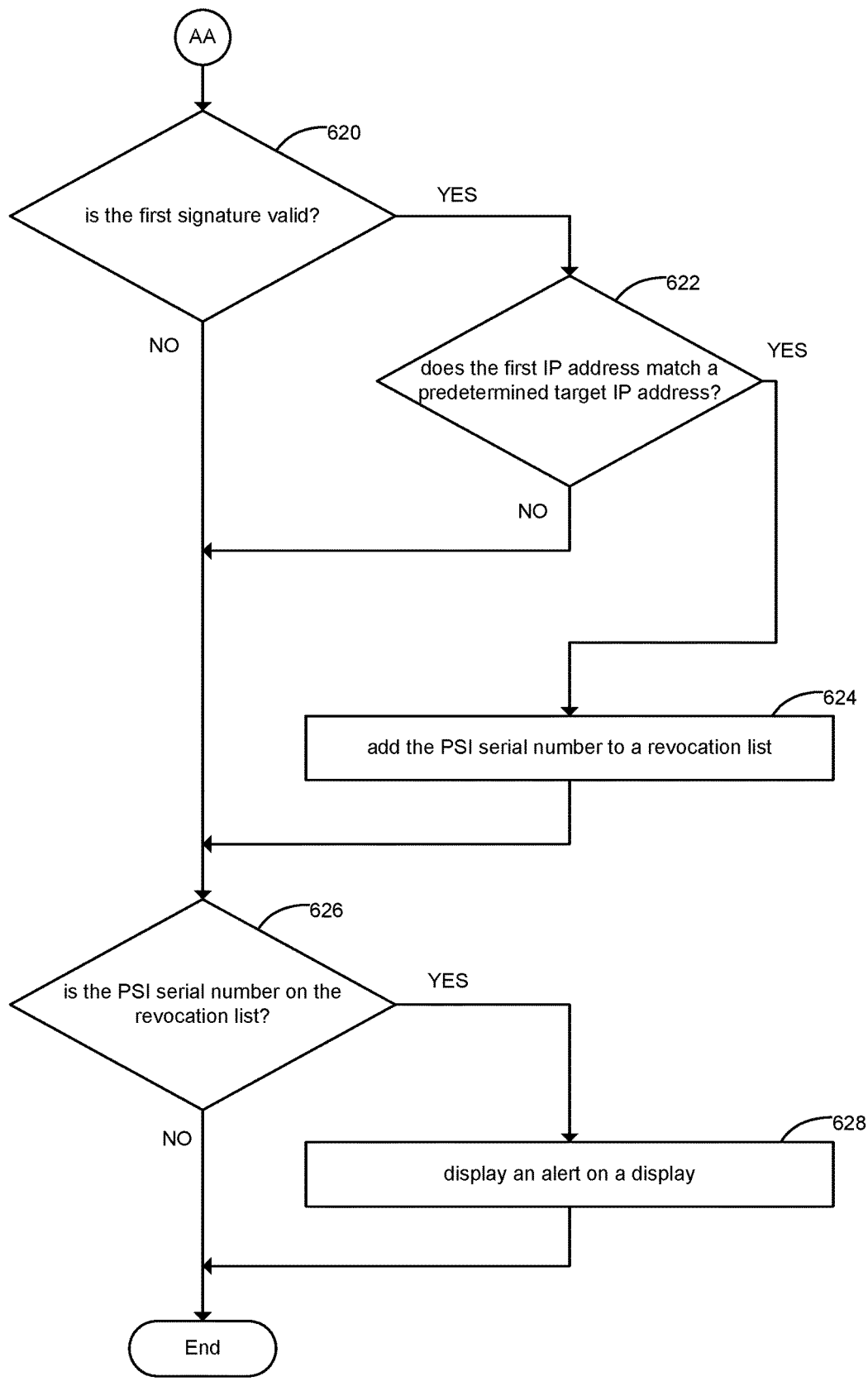

FIGS. 6A and 6B together form FIG. 6. FIG. 6 shows an example embodiment of a method of authenticating a printer supply item via an Internet connection according to one embodiment. Method 600 deters counterfeiters from manufacturing counterfeit printer supply items by making it more difficult to counterfeit authentication modules.

At block 602, the method starts. At block 604, a chain of trust is established from an Internet root name server to a rights management name server using DNSSEC including receiving a first public key from the RM name server. At block 606, a PSI serial number is received from a printer supply item. At block 608, a printer serial number is retrieved from a first non-volatile memory. At block 610, a message digest is generated from the printer serial number using a cryptographic hash function. At block 612, an encryption code is retrieved from a second non-volatile memory located on the PSI. At block 614, a message authentication code is generated from the message digest using the encryption code. At block 616, a domain name is transmitted to the RM server. The domain name includes the PSI serial number, the message digest, and the message authentication code. At block 618, a first IP address is received from the RM name server cryptographically signed with a first signature.

At block 620, a determination is made whether the first signature is valid. If it is valid, at block 622 a determination is made whether the first IP address matches a predetermined target IP address. If yes, then at block 624 the PSI serial number is added to a revocation list.

At block 626, it is determined whether the PSI serial number is on the revocation list. If yes, then at block 628 an alert is displayed on a display.

Figure 7:
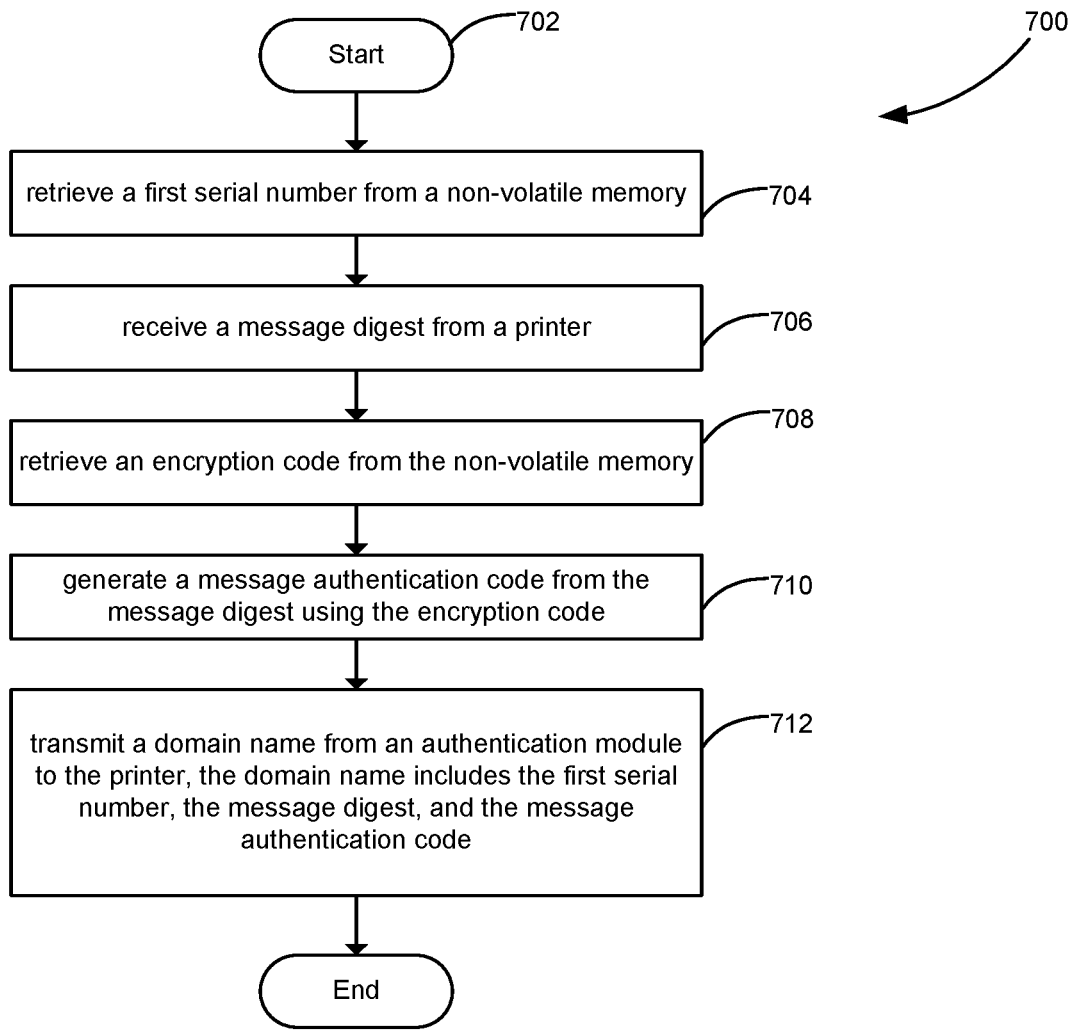
FIG. 7 is a flowchart of a method of operating an authentication module according to one example embodiment.

FIG. 7 shows an example embodiment of a method of operating an authentication module for a printer supply item according to one embodiment. Method 700 deters counterfeiters from manufacturing counterfeit printer supply items by making it more difficult to counterfeit authentication modules.

At block 702, the method starts. At block 704, a first serial number is received from a non-volatile memory. At block 706, a message digest is received from a printer. At block 708, an encryption code is retrieved from a non-volatile memory. At block 710, a message authentication code is generated from the message digest using the encryption code. At block 712, a domain name is transmitted from an authentication module to the printer. The domain name includes the first serial number, the message digest, and the message authentication code. The printer may use the domain name to update a revocation list as described previously.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. For example, method acts may be performed in alternate orders. An authentication module may be a PCB containing one or more authentication circuits, an authentication ASIC, etc. All modifications and variations are contemplated within the scope of the present disclosure as determined by the appended claims. Relatively apparent modifications include combining one or more features of various embodiments with features of other embodiments.

What is claimed is:

1. A method of operating an authentication module of a printer supply item (PSI) installed into a printer to manage a revocation list, the authentication module of the installed PSI includes a non-volatile memory, the method comprising:
retrieving a first serial number from the non-volatile memory of the authentication module of the installed PSI;
transmitting a domain name from the authentication module to the printer, the domain name includes the first serial number of the installed PSI;
transmitting from the printer the received domain name to a rights management name server (RM name server);
receiving a token with a format of an Internet Protocol address as a response to the transmitted domain name from the RM name server to represent a first IP address;
determining by the authentication module of the installed PSI whether the received first IP address matches a predetermined target IP address and if the determination is affirmative then adding the first serial number to update a first revocation list in the non-volatile memory of the authentication module of the installed PSI; and
transmitting the updated first revocation list having the added first serial number from the authentication module of the installed PSI to the printer.

2. The method of claim 1, further comprising:
receiving a printer serial number from the printer; and
generating a message digest from the printer serial number using a first cryptographic hash function,
wherein the domain name includes the message digest.

3. The method of claim 2, further comprising:
retrieving an encryption code from the non-volatile memory; and
generating a message authentication code from the message digest using a second cryptographic hash function with the encryption code,
wherein the domain name includes the message authentication code.

4. An authentication ASIC for a printer supply item comprising:
a non-volatile memory;
an I2C interface; and
a controller configured to perform the method of claim 3 using the non-volatile memory and the I2C interface.

5. An authentication ASIC for a printer supply item comprising:
a non-volatile memory;
an I2C interface; and
a controller configured to perform the method of claim 2 using the non-volatile memory and the I2C interface.

6. The method of claim 1, wherein the first IP address is a 32-bit number.

7. The method of claim 1, wherein the first IP address is a 128-bit number.

8. An authentication ASIC for a printer supply item comprising:
a non-volatile memory;
an I2C interface; and
a controller configured to perform the method of claim 1 using the non-volatile memory and the I2C interface.

9. A method of authenticating a printer supply item (PSI) installed to a printer via an Internet connection comprising:
establishing a chain of trust from an Internet root name server to a rights management name server (RM name server) using Domain Name System Security Extensions (DNSSEC) and receiving by the printer a first public key from the RM name server;
retrieving a PSI serial number from the installed PSI;
in response to the chain of trust being established, transmitting from the printer a domain name to the RM name server, wherein the domain name includes the PSI serial number;
receiving a token with a format of a first IP address from the RM name server cryptographically signed with a first signature as a response to the transmitted domain name;
determining by the printer whether the first signature is valid using the received first public key and if the determination is affirmative then determining whether the received first IP address matches a predetermined target IP address and if the determination is affirmative then adding the retrieved PSI serial number to update a revocation list; and
determine whether the PSI serial number is on the updated revocation list and if the determination is affirmative then displaying an alert on a display of the printer.

10. The method of claim 9, further comprising:
retrieving a printer serial number from a first non-volatile memory; and
generating a message digest from the printer serial number using a cryptographic hash function,
wherein the domain name includes the message digest.

11. The method of claim 10, further comprising:
retrieving an encryption code from the PSI; and
generating a message authentication code from the message digest using the encryption code,
wherein the domain name includes the message authentication code.

12. A printer comprising:
a non-volatile memory;
a network interface;
a printer-supply-item interface;
a display; and
a controller configured to perform the method of claim 11 using the non-volatile memory, the network interface, the printer-supply-item interface, and the display.

13. A printer comprising:
a non-volatile memory;
a network interface;
a printer-supply-item interface;
a display; and
a controller configured to perform the method of claim 10 using the non-volatile memory, the network interface, the printer-supply-item interface, and the display.

14. The method of claim 9, wherein the first IP address is a 32-bit number.

15. The method of claim 9, wherein the first IP address is a 128-bit number.

16. A printer comprising:
a network interface;
a printer-supply-item interface;
a display; and a controller configured to perform the method of claim 9 using the network interface, the printer-supply-item interface, and the display.

\* \* \* \* \*